US008260828B2

(12) United States Patent
Dijk et al.

(10) Patent No.: US 8,260,828 B2
(45) Date of Patent: Sep. 4, 2012

(54) ORGANIZING CONTENT USING A DYNAMIC PROFILE (75) Inventors: Esko Olavi Dijk, Eindhoven (NL); Freddy Snijder, Eindhoven (NL); Marc Andre Peters, Eindhoven (NL); Godefridus Antonius Maria Crienen, Baarlo (NL); Wilhelmus Henrica Gerarda Maria Van Den Boomen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 405 days.

(21) Appl. No.: 11/997,167

(22) PCT Filed: Jul. 18, 2006

(86) PCT No.: PCT/IB2006/052458
§ 371 (c)(1),
(2), (4) Date: Jan. 29, 2008

(87) PCT Pub. No.: WO01/53963
PCT Pub. Date: Jul. 26, 2001

(65) Prior Publication Data
US 2008/0235191 A1 Sep. 25, 2008

(30) Foreign Application Priority Data
Aug. 1, 2005 (EP) .................................. 05107091

(51) Int. Cl.
*G06F 17/00* (2006.01)
(52) U.S. Cl. ........ 707/812; 707/822; 707/805; 707/796; 707/793; 707/791

(58) Field of Classification Search .................. 707/791, 707/793, 796, 805, 812, 822
See application file for complete search history.

(56) References Cited

U.S. PATENT DOCUMENTS

| 7,424,678 B2 * | 9/2008 | Sezan et al. ................... 715/719 |
| 2002/0138836 A1 | 9/2002 | Zimmerman |
| 2003/0063770 A1 | 4/2003 | Svendsen et al. |
| 2003/0070070 A1 | 4/2003 | Yeager et al. |
| 2005/0021420 A1 | 1/2005 | Michelitsch et al. |
| 2005/0039177 A1 | 2/2005 | Burke |

FOREIGN PATENT DOCUMENTS

| GB | 2367216 A | 3/2002 |
| WO | 9901984 A1 | 1/1999 |
| WO | 0153963 A1 | 7/2001 |
| WO | 2004043069 A1 | 5/2004 |

* cited by examiner

*Primary Examiner* — Sana Al Hashemi (57) ABSTRACT

A portable data storage device (1) is disclosed to be used for organizing content (10, 11, 18) available to the data storage device (1). The device comprises means (12) for setting an information source (6) for a storage profile (9), a means (3) for receiving storage profile update data (7) from the information source (6), a means (4) for updating the storage profile (9) based upon the storage profile update data (7), a means (2) for organizing content (10, 11) based upon the storage profile (9) and a means (12, 13) for triggering the means (3) for receiving storage profile update data (7) from the information source (6). The device (1) is capable of organizing content in a dynamic manner based on data storage profiles that are also dynamic in nature whilst requiring minimum user intervention.

23 Claims, 6 Drawing Sheets

```
<profile version= "1.0" name="Top100.com">
<groupID>xyz123</groupID >
<updateinterval>24:00:00 hrs</updateinterval>
<rules>
   <rule name = "collect_song">
      <scope>
         <booleanAND>
            <fuzzystringmatch key="Artist" value="Alicia Keys"/>
            <fuzzystringmatch key="Song" value="Karma"/>
         </booleanAND >
      </scope>
      <action>
         <getcontent operation="copy" maxitems="1"/>
      </action>
   </rule>
   <rule name = "next_rule">
      ...
   </rule>
   ... more rules go here
</rules>
<datasource type="url">
<url>http://www.top100.com/members/auto_profile_top100.html</url>
<parseformat >
   ... data structure that specifies how the above url
                   should be parsed
</parseformat>
</datasource>
</profile>
```

FIG. 6

ORGANIZING CONTENT USING A DYNAMIC PROFILE

BACKGROUND OF THE INVENTION

The invention relates to a portable data storage device.

The invention further relates to a system for the storage of data.

The invention further relates to a method of a self organizing storage of data.

The invention further relates to a method of organizing of content in a network.

The invention further relates to a computer program product.

Portable data storage devices are well known from the state of the art. Such storage devices, for example CDs, DVDs, floppy discs or USB sticks, have the disadvantage that they are just "passive" storage media. This means that these devices have no intelligence of their own and therefore cannot exert influence for instance on the kind of content or data stored (e.g. mp3 music, video, jpeg pictures, documents etc). Therefore every time a user wants to store content on such a device the user must manually select the respective content. Thus the ease of use is rather low. This is even more user unfriendly when the content collection is of a non-static, or dynamic, nature, such as, for example, the latest music hits. This requires a user to manually modify the content collection on an even more regular basis.

BRIEF SUMMARY OF THE INVENTION

It is an object of the invention to provide a device of the type defined in the opening paragraph which is more user friendly.

In order to achieve the object defined above, with a device according to the invention, characteristic features are provided so that a device according to the invention can be characterized in the way defined below, that is:

A portable data storage device comprising means for setting an information source for a storage profile to be used for organizing content available to the data storage device, means for receiving storage profile update data from the information source, means for updating the storage profile based upon the storage profile update data received from the information source, means for organizing content based upon the storage profile and means for triggering the means for receiving storage profile update data from the information source.

A system according to the invention can be characterized in the way defined below, that is:

A distributed self organizing system for the storage of data, the system comprising at least two autonomous storage devices comprising means for exchanging data with one another, wherein the system is arranged to search for data stored on the storage devices, that match with a storage profile of the storage devices and to store data matching with said storage profile in those storage devices with a matching storage profile, the system further comprising means for receiving storage profile update data from the information source, means for updating the storage profile based upon the storage profile update data received from the information source and means for triggering the means for receiving storage profile update data from the information source.

A method of a self organizing storage of data according to the invention can be characterized in the way defined below, that is:

A method of self organizing data, the method comprising the method steps of setting an information source for a storage profile to be used for organizing content available to the data storage device, retrieving storage profile update data from the information source, updating the storage profile based upon the storage profile update data received from the information source, organizing content based upon the storage profile and triggering the means for receiving storage profile update data from the information source.

A method of self organizing of content in a network according to the invention can be characterized in the way defined below, that is:

A method of organizing content in a distributed self organizing system of data storage devices, each comprising a storage profile, and an information source, the method comprising the method steps of transmission of a request for storage profile update data to the information source, receiving the storage profile update data from the information source, updating the each storage profile based upon the storage profile update data received from the information source, organizing content based upon the each storage profile, and triggering the transmission of a request for storage profile update data to the information source.

A computer program product according to the invention can be characterized in the way defined below, that is:

A computer program product directly loadable into the memory of a programmable device, comprising software code portions for performing the steps of a method of a self organizing storage of data according to the invention or for performing the steps of a method of organizing of content in a network according to the invention.

The measures according to the invention provide the advantage that it is possible to achieve a physical and semantic self-organization of memory contents based upon a storage profile that is regularly updated. Since the data are stored on different devices according to the storage profiles of the devices, a user is enabled to physically retrieve stored content by selecting a storage device. Also intelligent self-organization of content based upon the content itself in combination with the regular updating of the storage profile only requires a user to initially identify a source for storage profile update data, the storage profile thereafter being regularly updated, whereby the process of self-organization is advantageously made easy to manage for both static and dynamic storage profiles.

The measures as claimed in claim 2 provide the advantage that a physical organization of contents stored can be achieved very quickly and efficiently.

It has proved to be particularly advantageous if the measures of claim 3 are provided. This achieves the advantage of providing a simple manner to replace a storage profile.

The measures as claimed in claim 4 provide the advantage that a storage device can make direct use of information from an information source in a storage profile.

The measures as claimed in claim 5 provide the advantage that information from an information source can still be used to create a storage profile independent of the format of the information.

The measures as claimed in claim 6 provide the advantage that the analysis method can be retrieved and updated at any time.

The measures as claimed in claim 7 provide the advantage that the analysis method related to a particular storage profile can be logically located with that storage profile.

The measures as claimed in claim 8 provide the advantage that the analysis method can be updated from a remote device or service offering improved functionality and flexibility.

The measures as claimed in claim 9 provide a simple and efficient source of semantically valuable information that can be used as input to the self-organization process.

The measures as claimed in claim 10 provides a metadata search service to other data storage devices improving the performance of satisfying a search request.

The measures as claimed in claims 11 provide the advantage that the organization of the content is in optimal agreement with the storage profile of each data storage device.

The measures as claimed in claim 12 further provides the advantage that the device autonomously analyzes the content of data without the need of receiving additional information from outside. Further it can be proved very easily using the metadata, whether content stored on a device matches with the storage profile of another device.

The measures as claimed in claims 13 provide the advantage that data storage devices can communicate without wires.

The measures as claimed in claim 14 provide the advantage that the data storage device can update a storage profile based on a regular time basis, such as daily or weekly.

The measures as claimed in claim 15 provide the advantage that a user can initiate the updating of a storage profile.

The measures as claimed in claim 18 provide the advantage that a data storage device can use its own known resources to determine content to be requested from other data storage devices and thereby guarantee performance.

The measures as claimed in claim 19 provide the advantage that a data storage device can efficiently organize content with other data storage devices.

The measures as claimed in claim 20 provide the advantage that a data storage device can have limited resources and therefore be inexpensive.

The measures as claimed in claim 21 provide the advantage that a data storage device can efficiently organize content with other data storage devices.

The measures as claimed in claim 22 provide the advantage that information from an information source can still be used to create a storage profile independent of the format of the information.

The measures as claimed in claim 23 provide the advantage that a data storage device is independent of any external source of metadata information.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

The Figures are schematically drawn and not true to scale, and the identical reference numerals in different Figures refer to corresponding elements. It will be clear for those skilled in the art, that alternative but equivalent embodiments of the invention are possible without deviating from the true inventive concept, and that the scope of the invention will be limited by the claims only.

DETAILED DESCRIPTION OF THE INVENTION

Figure 1:
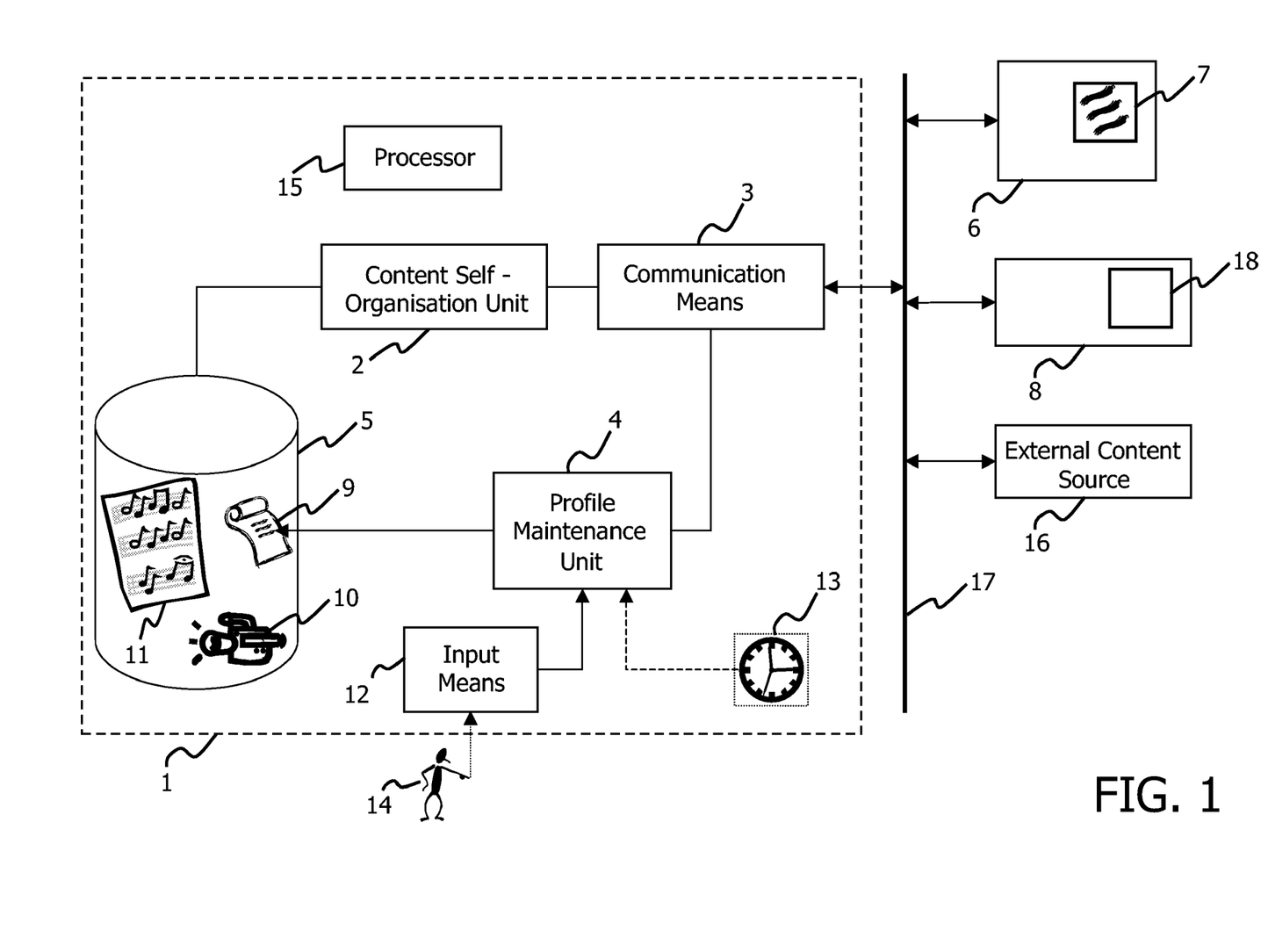
FIG. 1 shows a portable storage device according to the invention in the form of a block diagram.

FIG. 1 shows a portable storage device according to the invention. The portable storage device according to the invention, in the following for the reason of easier readability indicated as "storage bubble 1", is an autonomous storage container. "Autonomous" means that the storage bubble 1 forms an independent structural unity. The storage bubble 1 comprises means for autonomously looking for data stored on another device matching with a storage profile 9 of the storage bubble 1. At this point it is important to mention that autonomous means that it can act by itself.

The means for autonomously looking for data and storing these data are, according to the embodiment shown, embodied by means of a processor 15, which comprises a respective software that is executable by the processor 15, communication means 3 connected with the processor 15 and at least one permanent memory 5 accessible by the processor 15 by known means to the person skilled in the art. Instead of using the suitable programmed processor 15 the storage bubble 1 can be provided with one or more circuits realizing the same functionalities. A dynamic memory could also be provided and be understood to comprise the same meaning as that of having a memory and a processor integrated into each other. The communication means 3 can be realized, for example, with a means for wired or wireless communication. Such communication means could be via a Universal Serial Bus (USB), a Bluetooth, a Wireless Fidelity Connection (WI-FI) or communication according to the Near Field Communication (NFC) standard. By means of the communication means 3 the storage bubble 1 can communicate with other storage bubbles or other devices. Furthermore, the storage bubble 1 comprises an internal current supply that is not shown in FIG. 1, for example, a battery or an accumulator. The storage bubble 1 has preferably no means for rendering content. Thus an optical or acoustic rendering of content is expected to take place on a remote rendering device, although preferably metadata could be rendered on the storage bubble 1. However, in principle the storage bubble 1 can be merged with a rendering device too, such as an MP3 player, for example.

A user can set a storage profile 9 for the storage bubble 1 being for instance: "This bubble will be used in low bandwidth environments", for example, environments where only communication via Bluetooth is available, or "popular music only."

This storage profile 9 provides the storage bubble 1 with information about the content to gather. The storage profile 9 is, according to the embodiment shown, stored in the permanent memory 5 of the storage bubble 1 and be defined at different levels of granularity.

The storage profile 9 can, for instance, only contain information about the type of content that shall be stored in the permanent memory 5 of the storage bubble 1, for example, audio, video, digital pictures and text or other types of data. In this case the storage bubble 1 will collect any audio, video, text or other type of data. For all content types selected in the storage profile 9 a bandwidth profile can be given by providing a target bit rate or target communication technology, for example, Bluetooth for the selected content type.

Further the user 14 can give more specific information about the chosen content when setting up the storage profile 9. Setting up the storage profile 9 for videos can be based on a selection from a standard set of genres, events or content moods, such as romantic, funny, etc. Setting up the storage profile 9 for videos can be further based on keywords in the title, author information and spoken words in the content or pieces of video, for example.

For audio data the set up of the storage profile 9 can be based on a selection from a standard set of genres, events or content moods. Setting up the storage profile 9 for audio content can also be based on keywords in the title, artist information and spoken/sung words in the content. Audio profiles can in principle also be based on audio fingerprints, "humming" or other acoustic information, for example, where the user hums what the audio should sound like. In the last case the storage device can comprise means for the input of voice such as a microphone. For text contents setting up the storage profile 9 can be based on keywords. For data of any type setting up the storage profile 9 can be based on file name and file extension.

However it is possible that the storage profile 9 contains information of how to deal with contents created on certain dates. Thus it is possible to discriminate on file creation or file modification date. In this way storage bubble 1 interconnected with a second data storage device 8 and constituting a network, also as shown in FIG. 1 can organize the available content according to the storage profile 9 based on time, which results in an automatic archival system. Of course profiling based on content and creation date can be combined. In this way the storage profile 9 can be created such that the storage bubble 1 will store for example the latest news.

The storage profile 9 can comprise multiple elements, but preferably at least a group identity, which may in turn comprise elements such as one or more network identifiers, stating to which network(s) of storage devices this device belongs to, one or more user identifiers stating who is/are the owner(s) of this device, or an explicit data sequence coding the information "open to all" to state that content may be accessed and/or possibly changed by anyone or any device. Furthermore, it is preferable if the storage profile 9 also comprises one or more content collection rules, i.e. coding for "what type of content should this device gather", where each rule can comprise the rule's scope, i.e. a set of attributes and their mutual relations, for example using Boolean logic, describing the properties of content that are required to let a content item fall under the scope of this rule. Any content item that is in the scope of a rule will be subject to the rule's action. The scope specification may also include whether the rule applies only to content on the portable device, only to content outside the portable device, or all content wherever it is stored. The rule's action is a specification of the action that needs to be taken by the host device when a content item falls under the scope of this rule. Actions are for example: "request this content item to be moved to the current device"; "request this content item to be moved away from the current device"; or "request this content item only if no other device wants to request it with an importance value>=15". The inclusion of group identity data above is a matter of definition: one could also state that each device contains a group identity data item and a profile data item consisting of rules. It is perfectly possible that a device contains multiple profiles, for example, one for each network that the device is a part of. Then, the device is actually part of multiple systems.

Figure 6:
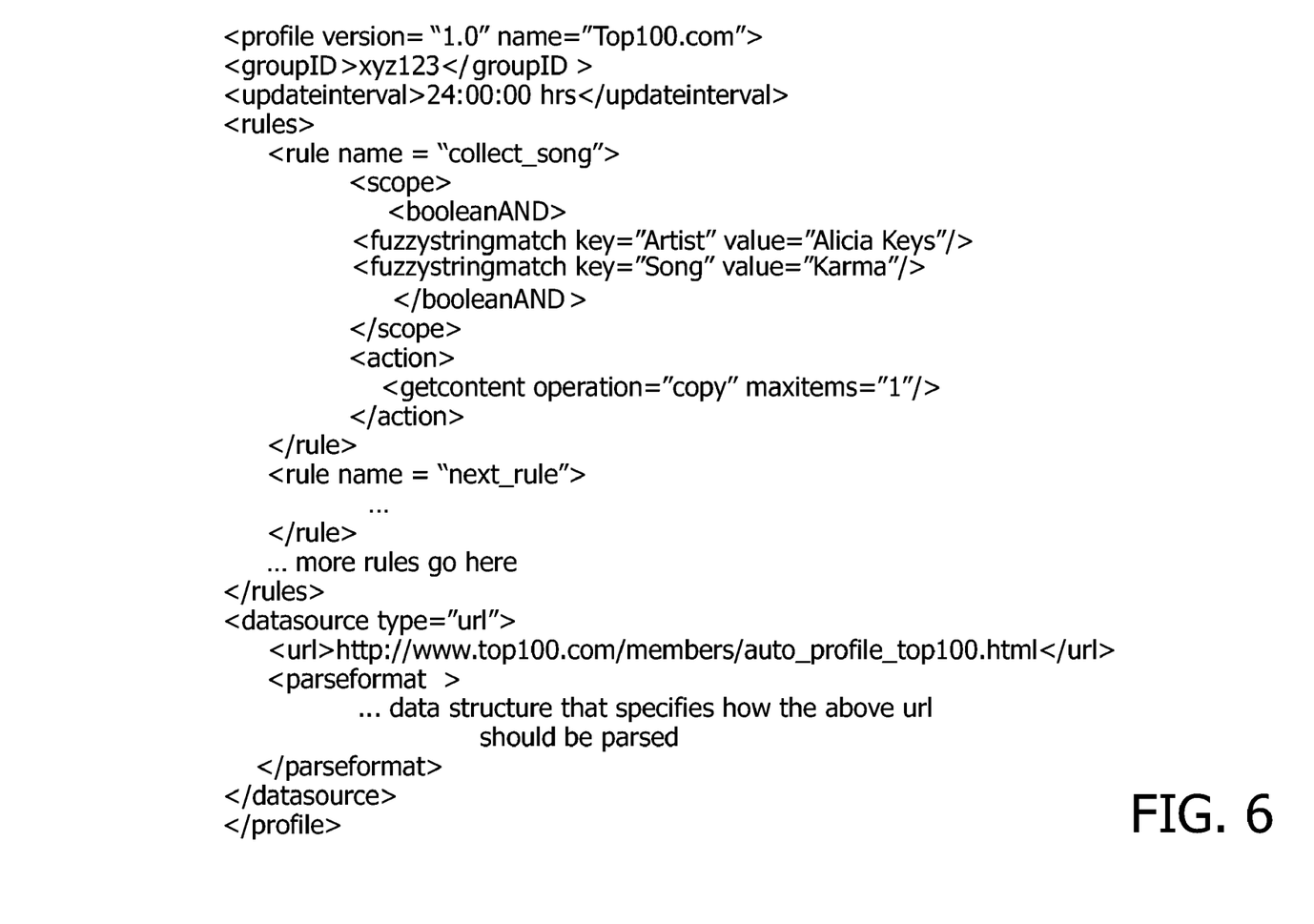
FIG. 6 shows a typical storage profile according to the invention.

A typical embodiment of a storage profile in XML format according to the invention is shown in FIG. 6. It should be noted that some elements of the storage profile defined in FIG. 6 that are obvious to the skilled person are not complete and are identified by three dots. Typically, the <rules> part is updated more often than the <datasource> part. The latter part could be entirely fixed, or could also be updated periodically, for example, this is useful if a web site changes its data format.

The storage bubble 1 also comprises an input means 12, shown in FIG. 1, for the input of the storage profile 9 or the input of an information source 6 for storage profile update data 7. The input means 12 may be a touch screen with menu navigation, simple keypad or another known input means. Furthermore, the storage profile 9 can for instance be entered via an external computer connected with the storage bubble 1 via a wireless or wired connection. In this case a user interface of the storage bubble 1 for entering the storage profile 9 can be transferred to the computer and shown on a display of the computer. It should be understood that the use of multiple information sources as the information source 6 is also an obvious extension of the present invention.

To make setting of the storage profile 9 easier a user can choose from preset contents and data formats the favored contents and formats, for example, by activating the desired contents and formats via mouse click. However, it can also be provided that several pre-defined storage profiles are available. Thus a user can choose one of several preset storage profiles of the storage bubble 1.

In addition, the storage profile 9 could be created by providing one or more content items to use as examples from which a storage profile 9 can be derived. For example, the user may select several photos, for example, beach photos, and then tell the storage bubble 1 to generate a storage profile 9 based on these photos. After this the storage bubble 1 will look for other beach photos stored on other devices, such as the second data storage device 8, as well. This provides the advantage that the user does not have to specify a detailed storage profile 9, and only has to provide examples of the content that should be stored on the storage bubble 1.

It is an advantageous feature of the invention that the storage profile 9 may be regularly updated since in general a self organizing storage device having a storage profile 9 requires that the storage profile 9 be updated by a user manually for each individual storage bubble 1, i.e. when changes are desired, manual actions are required. This is a severe disadvantage when a user would like to have a storage bubble 1 containing a non-static collection of content, like for example "the latest hits". Then, a user has to manually find the most popular songs or artists at a given moment, and set these songs or artists in the storage profile 9. Furthermore, this process has to be regularly performed in order to stay up to date with the latest hits. So the manual solution is infeasible in practice. The same problem exists for storage profiles like 'music similar to sky radio', or content recommended by a website, in fact, for any data which may change frequently.

In the embodiment of FIG. 1 a profile maintenance unit 4 receives an indication from a user 14 of an information source 6 from which storage profile update data 7 can be retrieved. The indication can be a Uniform Resource Locator (URL) or other known means for identifying a location on a network 17. The profile maintenance unit 4 communicates with the information source 6 via a communicating means 3 and a known network 17, for example, the Internet. As in known the network 17 may comprise intermediate devices through which connections may be built. The storage profile update data 7 can be in a format that is directly applicable to a storage profile 9, i.e. already be in storage profile format, or the storage profile update data 7 can be raw information, which has to be analyzed further before the storage profile 9 can be constructed. Such further analysis is performed by the profile maintenance unit 4 and results in an update to the storage profile 9. The analysis method used by the profile maintenance unit 4 can, in turn, be a method or algorithm comprised within the storage profile 9, or be loaded onto the storage bubble 1 the first time that the storage profile 9 is set by the user 14. The analysis method may be comprised within a first-time storage profile, i.e. before any storage profile updates have occurred and may come from any external source, for example, from a website, RF-ID tag, a CD-ROM, another storage device, email, etc. The analysis method could optionally be implemented as executable code. It could also be specified indirectly through an interpreted declarative language. Furthermore, a combination of the measures identified may be used.

Once a storage profile 9 is set or is updated on a storage bubble 1, the storage bubble 1 uses the new storage profile for self-organization of content within the system, which the storage bubble 1 is a part of. Furthermore, the storage profile 9 may also be used for acquisition of new content that is not yet present in the system. This may include a method of online payment using known electronic commerce measures.

Figure 2:
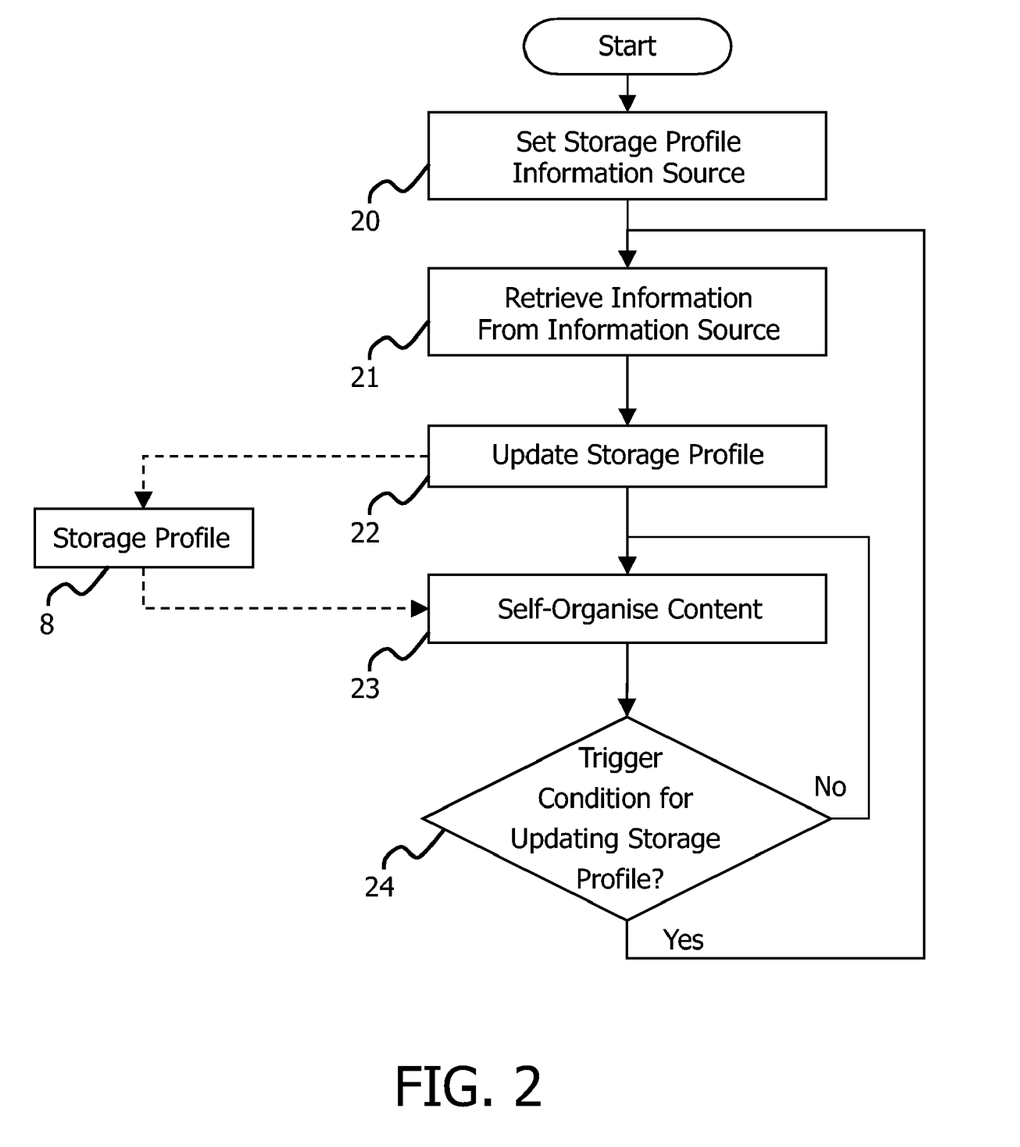
FIG. 2 shows a flow chart of a content self-organization process using updated storage profiles according to the invention.

The flowchart of FIG. 2 indicates the method according to the invention for updating the storage profile 9. At step 20 the information source 6 to use as a source for storage profile update data 7 is set. As described earlier this can be input directly by user 14 using the input means 12, or from a remote location connected by the communication means 3 and the network 17. At step 21 the storage profile update data 7 is retrieved from the information source 6 using the communication means 3 and the network 17. At step 22 the storage profile 9 is updated by the storage maintenance unit 4. The updated storage profile 9 is then stored in permanent memory 5. At step 23 a process step of self-organization is performed. This method step, step 23, may also be implemented as a parallel process to the updating of the storage profile 9, however, a certain amount of cross process communication will be necessary to prevent inconsistencies occurring in the storage profile 9. At step 24 a decision point is reached where it is checked whether it is necessary, or not, to update the storage profile 9 again. The trigger condition for initiating an update to the storage profile 9 can be time related initiated by a timing means 13, such as, a timer or clock. The trigger condition could also be initiated by the input means 12 by a user 14, or from a device on the network 17 via communication means 3.

An important concept used within the organization of data in the present context is content metadata. This metadata provides information about content such as: Title of content, video/program or music genre, positions of events in the content, such as football goal events, descriptions of events in the content, time/date of creation, GPS location of creation, content mood, low-level content features, such as average luminance, amount of motion in video content, audio features, etc. It could also be content signatures, i.e. humming signature, for instance, or information of how content is encoded, bit rate information, objects on a photo, etc. The metadata may also be embedded within the content according to known standards, such as EXIF, ID3, an MPEG standard or according to a proprietary means.

Figure 3:
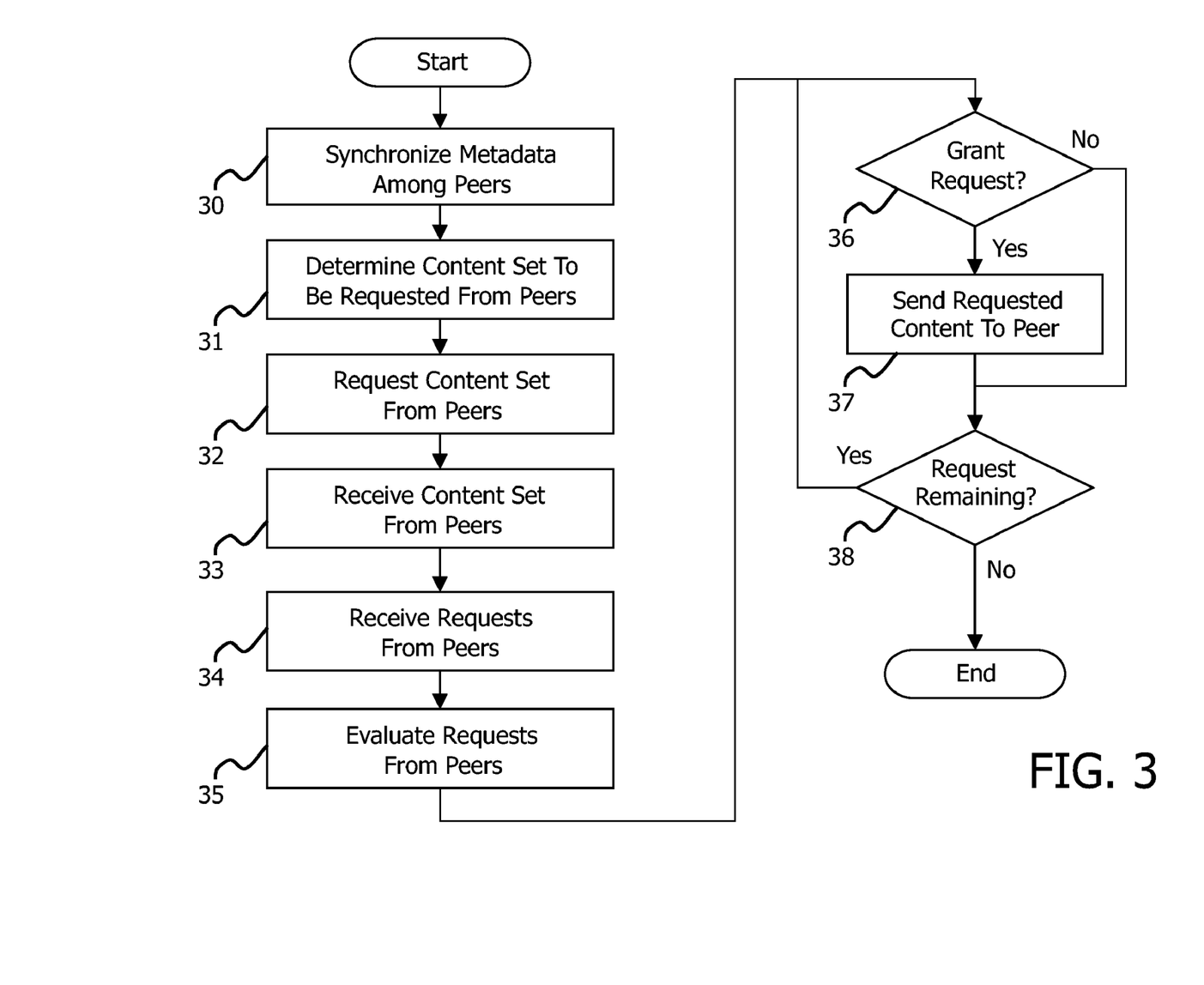
FIG. 3 shows a flow chart of a content self organization process in detail where a pull mode is used according to an embodiment of the invention.

In the flowchart of FIG. 3 an embodiment of the self organizing process which works in a pull mode of operation is shown that uses such metadata. In step 30 such metadata is exchanged between storage bubbles. The metadata of content is used to decide in step 31, based on the storage profile 9, if the content stored on a second data storage device 8 is of interest to the storage bubble 1 and if and how the content shall be processed. Metadata of content could already be available from a stationary storage device however this should not be expected by default. In order to keep the storage bubble 1 independent from the functionality of other devices the storage bubble 1 can comprise means for analyzing data on its own. This analyzing means can for instance be realized with software installed on the processor 15 of the storage bubble 1. This analyzing software can be realized by means of software as, for instance, commonly used for speech pattern recognition. The analyzed data can for instance be searched for specific keywords. According to the result of the analyzing process metadata containing information about the analyzed content can be created. This metadata can provide the information described above. The metadata of analyzed content are preferably stored in the storage bubble 1. Whether a content, or to be more exact the data containing this content, match with the storage profile 9 of the storage bubble 1 can be proved via a comparison of the storage profile 9 with the metadata of the content being analyzed.

In step 32 content is requested from other storage bubbles that agrees with the storage profile 9 of the storage bubble 1. In step 33 the replies, if any, from the other storage bubbles are received. According to an embodiment of the invention the storage profile 9 of the storage bubble 1 can also contain information about the desired storage bubble behavior concerning, for instance, when to delete or move what content and what part of the content specified by the storage profile 9 has higher priority than another part of the content linked to the storage profile 9. When almost all the storage capacity of the storage bubble 1 is used the storage bubble 1 can make a decision how to respond to this situation. The storage bubble 1 can request another storage bubble, such as the second data storage device 8, of a network 17 of storage bubbles 1 as shown in FIG. 1 to accept content that fits the storage profile 9 less than other content stored on the asking storage bubble 1. So some content defined by the storage profile 9 can be given more priority than other content. This priority can be defined by the user 14 in the storage profile 9 when setting up this storage profile 9 of the storage bubble 1. The reverse situation is also possible whereby the second data storage device 8 transmits requests to the storage bubble 1 as denoted in step 34 of FIG. 3. Such request must, of course, be evaluated by storage bubble 1 with respect to the storage profile 9, as shown in step 35. Thereafter, the storage bubble 1 can decide to grant each request in step 36. For granted requests storage bubble 1 then sends any content requested by the second data storage device 8. This cycle is repeated for step 38 until all requests have been processed.

It should be noted that complex negotiation, as described above, is not explicitly required to practice the invention and that default negotiation strategies may be used. In the simplest form, such as default negotiation strategy could be, for example, grant all requests.

Figure 4:
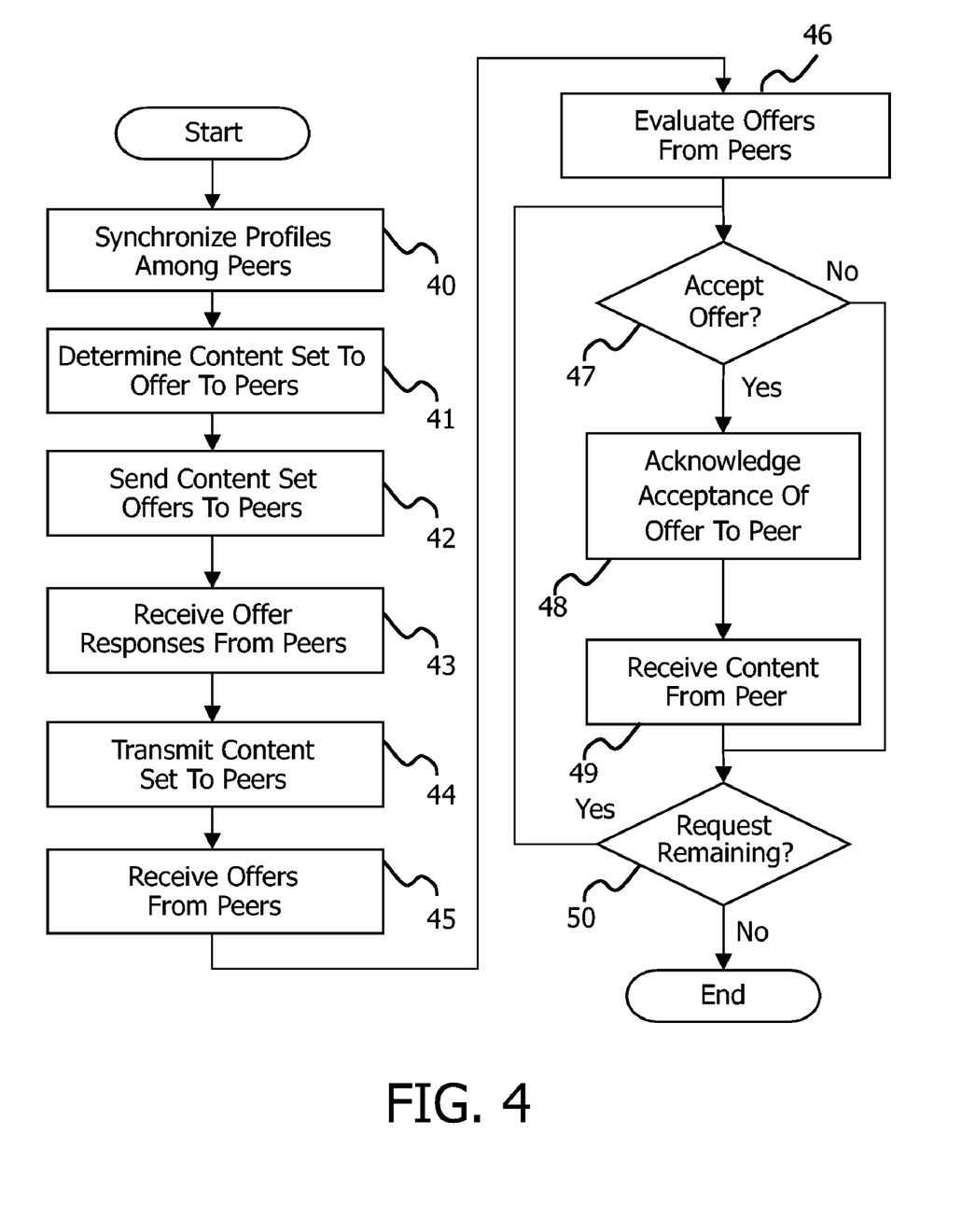
FIG. 4 shows a flow chart of a content self organization process in detail where a push mode is used according to an embodiment of the invention.

In FIG. 4 a further embodiment of the self organizing process is shown that make use of a push mode. Initially at step 40 all relevant storage profiles are exchanged between the storage bubbles present on the network 17. Each storage bubble then determines in step 41 which content set is to be offered to which storage bubble. Step 42 involves the transmission of each offer to designated storage bubbles on the network 17. In the co-operating process each storage bubble can receive offers from other storage bubbles on the network 17, as shown in step 43, and thereafter in step 44 transmit an agreed content set to the other storage bubbles. For empty content sets step 44 may, of course, be a "no operation" step. Storage bubble 1 may also receive unsolicited offers from other storage bubbles as shown in step 45, which must be evaluated in step 46 with reference to the storage profile 9. Each offer must be decided upon in step 47 and for acknowledged offers an acceptance can be transmitted to the offering storage bubble in step 48. The storage bubble 1 can then receive the offered content in step 49. All offers should, of course, be evaluated and this is performed in step 50 of FIG. 4. Again the complex negotiation, as described above, is not explicitly required to practice the invention and that default negotiation strategies may be used.

It can be furthermore defined in the storage profile 9 what to do when the storage bubble 1 is full and no other storage bubble accepts content. In this case the storage bubble 1 can according to the settings of the storage profile 9 delete content directly, stop immediately with gathering content or delete content only after a few days or weeks and then continue gathering and organizing. All these features of the storage bubble 1 are provided by the aid of the communication means 3, the permanent memory 5 and the processor 15 mentioned above.

In addition the processor 15 of the storage bubble 1 can, for example, comprise software for monitoring how full the permanent memory 5 is. If the stored content in permanent memory 5 represents a size that is more than a certain threshold the processor 15 can transmit via the communication means 3 content and the associated metadata to the second data storage device 8.

If the storage bubble 1 requests the transfer of content to the second data storage device 8 because the storage bubble 1 is full there is provided an acceptance policy in place. This policy can, for instance, be based on the level of storage profile fitness of the content, the storage capacity available and a minimum reserve storage capacity of the second data storage device 8.

The content from stationary storage devices or other storage bubbles copied or moved to the storage bubble 1 can be downscaled versions or otherwise processed versions of the original content. For instance, to watch a video on a Personal Digital Assistant while traveling could require a low bit rate or low-resolution version of the original video. Said downscaling and processing can be carried out, for instance, by means of a suitable programming of the processor 15.

In principle content processing functions, such as transcoding, that are frequently needed are realized in the storage bubble 1 itself, as mentioned above, to keep it as autonomous as possible.

But it is also possible that a stationary storage device or any other device processes the content of interest for the interested storage bubble 1 as a service. For instance, a Hard Disc Drive recorder usually has an encoder/decoder functionality. This functionality can be used to transcode a requested video stream to the requested format. Transcoding and other processing functionalities can be offered through standardized interfaces and service discovery, for instance using Universal Plug and Play (UPnP).

The storage bubble 1 may further comprise a means for content indication. This means can for instance be realized with Light Emitting Diodes (LEDs) that light up a housing of the storage bubble 1 in different colors according to the content stored. The exterior of the storage bubble 1 can be divided into a number of sections, for example four, representing different types of content, e.g. audio, video, digital pictures and text (Word, pdf, etc.) or data (Excel, binary data not audio or video etc.) or indicating semantics like, for instance, "beach" photos, family pictures, "scuba-diving" pictures and pictures of a new born child. Every section may have its own color created by using the LEDs, as mentioned above, or other means of illumination. The amount of data of a certain kind or the amount of content stored in the storage bubble 1 can be shown by the intensity of the assigned color. For instance, the brighter the color allocated to a certain content type the more of that kind of content is stored on the storage bubble 1. In other words the external appearance of the storage bubble 1 can depend on the content stored in the storage bubble 1. For instance if the storage bubble 1 changes into red it indicates that it mostly contains audio or if the device turns into green it indicates that mainly action movies are stored on it. In this way a rudimentary selection of content from a set of portable storage devices is made very easy for the user.

When a storage bubble 1 is selected based on this rudimentary information about the content, more detailed indication methods can provide further information about the content to the user, for example, by means of a display on which the user 14 can browse through the content stored on the storage bubble 1. For instance the display of the storage bubble 1 can show multiple icons of different sizes, wherein an icon indicates what content is stored and the size of the icon 1 can indicate how much is stored of that content type. Furthermore, the display can be of the E-ink display type. This means that the icons on the display remain visible for a few days even though the display is not powered. In such a way there may be no need for LED lights for indication. The display could actually be a "skin" of the device; the skin is visible from all sides making it easier to visually select a storage bubble from different perspectives.

To make it possible to compare the amount of content of different modality, for example, audio and video, the icon size can be related to the number of streams or files stored on the device rather than the storage size. Using, for instance, a touch screen interface clicking an icon will show a list or summaries of the content represented by the icon.

It is possible to realize just one of the above mentioned indication methods (via display, or color) or a combination of these indication methods in the storage bubble 1.

Summarizing the indication methods it can be said that the color (illumination) indication is the most rudimentary and provides a first clue to the user 14. When picking up the storage device 1 the user 14 can switch on the display, if one is provided, and see what is stored in the storage bubble 1 in more detail by looking at the icons. If, based on the icons, the content type of interest is available the user 14 can browse further by selecting the icon of interest.

In order to save battery life the storage bubble 1 may also comprise a proximity detection mechanism, or a "pick up" detection mechanism, detecting when the storage bubble 1 is physically moved. In this case the different types of optical indications only light up when a user 14 is close to the storage bubble 1 or when the storage bubble 1 is picked up. The proximity detection mechanism can, for instance, be realized by means of a motion detector connected to the processor 15 that controls the illumination means, for example, the LEDs. The pick up detection mechanism can for instance be realized by means of a contact sensor, wherein the contact sensor can be connected with the processor 15 controlling the illumination means.

Specific content can for instance be represented on the display in the following ways: Video streams can be summarized by showing a video manga, where a video manga is a video summary in the form of a (Japanese) comic book, a sequence of key frames, a trailer showing some key scenes or a DVD or VHS box cover. Also a simple list with the title and playing actors can be given. For digital pictures, for instance, thumbnail versions can be shown or an automatically generated photo collage of a set of pictures can be shown. Playing the chorus in case of a popular song, showing the CD cover with song title, showing a transcript of the speech in the audio, could represent audio streams or showing text parts of a text document. In all cases also a simple directory tree showing file name and other attributes could be given.

The content retrieval process can start with selecting the storage bubble 1 based on very rudimentary representation of stored content, for example, by color intensity. For example, if the storage bubble 1 has a bright red color and assuming red presents video, the storage bubble 1 therefore contains videos. When selected the display is turned on and it is identified in more detail what type of content is available on the selected storage bubble 1 indicated by means of icons with different sizes. If a user 14 is looking for comedy series, the user can select "comedy series" icon, assuming such an icon exists.

If the content type of interest is available the content of that type can be browsed using summarized representations. In the present example the user 14 can browse through comedy series. The respective video cover or manga can represent the comedy series stored, for instance.

Because different media, such as audio, video and pictures need different storage capacities and have different content analysis needs, multiple kinds of storage bubbles can be defined. Different storage bubble types can be sold as active counter parts of passive storage media. This will certainly be possible looking at the decreasing trend of processing, storage and networking technology costs. Storage bubble models with the following storage capacities and functionality could be differentiated for instance:

A storage bubble 1 with the storage capacity of a typical memory stick or other solid-state memory card, e.g. 128 MB, with text and spreadsheet analysis capabilities and simple text and spreadsheet browsing capabilities or image content analysis capabilities and image thumbnail rendering capabilities;

a storage bubble 1 with the storage capacity of a normal CD with audio or content analysis capabilities and simple audio rendering capabilities;

a storage bubble 1 with the storage capacity of a DVD with video content analysis capabilities and simple video summarization capabilities using thumbnail key frames or a thumbnail video manga compilation;

a storage bubble 1 with the storage capacity of a BluRay Disc with video content analysis capabilities and simple video summarization capabilities using thumbnail key frames or a thumbnail video manga compilation or a generic storage bubble 1 with a storage capacity of a large HDD, for example, 5 Gb to 300 GB, and a large variety of content analysis capabilities.

What wired or wireless networking capabilities are present could also be differentiated although this will limit the communication only to devices that have the same communication and networking capabilities.

Using for instance a Wireless Fidelity Connection (WI-FI connection) the storage bubble 1 can also directly access an Internet service via a WI-FI access point connected to a broadband connection, e.g. ADSL. As a service it is possible to download different content analysis functionalities for a fee from a server via the Internet such that the storage bubble 1 can change its "expertise" from, for instance, audio to digital pictures. The service lists all the content analysis possibilities for each storage bubble model.

Further the Internet service may provide content that matches to the storage profile 9 of the storage bubble 1. The content of interest can be bought directly, or downloaded for free, from the Internet service. The user 14 can, for instance, set in the storage profile 9 of the storage bubble 1 the maximum amount of money that the storage bubble 1 can spend. The user 14 can give, when subscribing to the online service, all information to make an automatic purchase possible, for example, credit card information.

To give a user more control over purchase the user 14 can get a message, for example, an SMS, MMS or e-mail, with a link to a site enabling the user 14 to cancel or approve the order put by a storage bubble 1. The message mentioned above could be transmitted to the storage bubble 1 and be displayed on the storage bubble 1. Although the focus here is on portable storage bubbles 1 the method described above can be applied to network storage devices in general.

Figure 5:
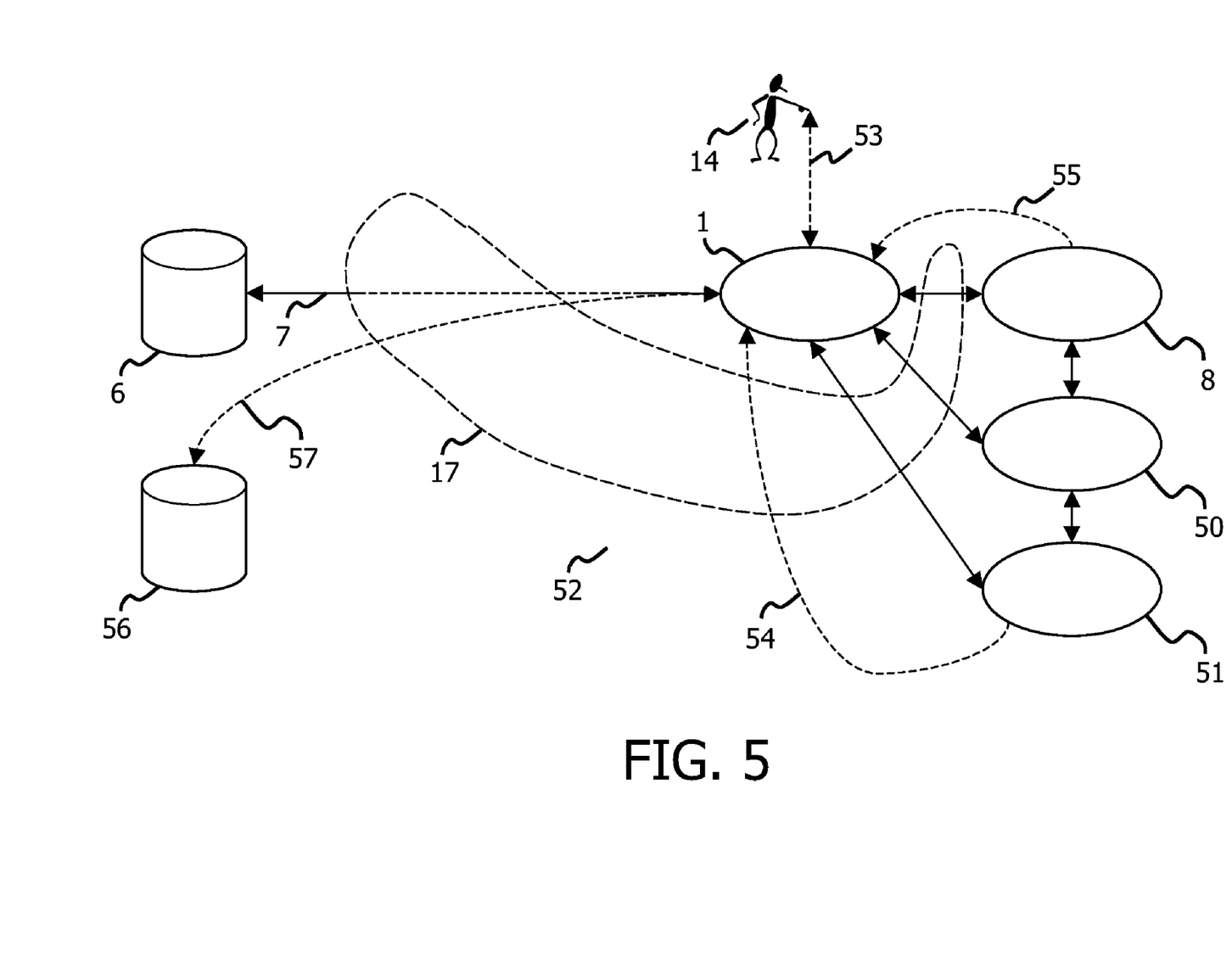
FIG. 5 shows a schematic diagram of a system according to the invention.

FIG. 5 shows a distributed self organizing system 52 for the storage of data according to the invention. The system comprises a network 17 of N storage bubbles 1, 8, 50, 51 of the type of the storage bubble 1 described above and shown in FIG. 1. The network 17 can also comprise stationary and non-autonomous storage devices, such as, for instance, a Personal Computer, a home media server, a HDD-, DVD- or so called "blue ray disc" recorder. Content of interest for a storage bubble 1, 8, 50, 51 not available on any of the storage bubbles 1, 8, 50, 51 can be retrieved from the stationary or other storage devices that can store content from external sources like analog audio/video broadcasts, digital video broadcasts, digital home video/picture/audio content, internet content or non broadcasted published content (audio, CD, DVD, etc.). Content can also be available from the network 17, for example, the Internet.

In the embodiment of FIG. 5 the storage bubble 1 contacts an information source 6 from which storage profile update data 7 can be retrieved. The indication can be a Uniform Resource Locator (URL) or other known means for identifying a location on a network 17, for example, the Internet. Once a storage profile 9 is set or is updated on a storage bubble 1, the storage bubble 1 uses the new storage profile for self-organization of content within the system, which the storage bubble 1 is a part of via content move actions 54 or content copy actions 55. Furthermore, the storage profile 9 may also be used for acquisition of new content that is not yet present in the system. This may include a method of online payment using known electronic commerce measures 57 from a online retailer 56.

Self organization of the content stored in the system 52 can be achieved very easily since the storage bubbles 1, 8, 50, 51 are arranged to exchange content and other data, for example, metadata, with one another, using wired or wireless networking technology, for instance USB, WI-FI and Bluetooth, such that the storage profiles of all the bubbles 1, 8, 50, 51 are satisfied as much as possible.

The protocol and interface for content and (meta)data exchange and processing can for instance be an industry standard protocol and interface, e.g. MPEG-21, UPnP, or any proprietary protocol and interface.

Although digital home video/audio/pictures can be seen as an external source digital video cameras and audio recorders having network capabilities can directly be accessed by a storage bubble 1, 8, 50, 51. In general any device with network capabilities that implements a protocol and interface for content and metadata exchange and processing can directly be accessed by a storage bubble.

Storage bubbles 1, 8, 50, 51 in general communicate and exchange information by a standardized protocol STP and standardized interface STI. In general storage bubbles 1, 8, 50, 51 do not have means to directly get content from input sources such as analog cable TV/radio or a DVD. To get content not already available on the storage bubble network, they can communicate, using for instance a WI-FI connection, with storage devices which have these means. In order to do this with a large number of devices from different vendors the interfaces and protocols used are preferably standard.

Although a storage bubble 1, 8, 50, 51 could, in principle, get content directly from input sources this is not the main intention of storage bubbles. Although storage bubbles can have different forms and implementations, they are generic storage devices independent of any form of content type and specific means of retrieving information, such as a tuner for analogue digital video broadcasts or a DVD. Further the costs of a storage bubble 1, 8, 50, 51 as a consumer electronics product should be low such that consumers are willing to buy many storage bubbles 1, 8, 50, 51 enabling the concept of self organization. But nevertheless a storage bubble 1, 8, 50, 51 can comprise, although it is not the preferred embodiment, rendering capabilities.

The more storage bubbles 1, 8, 50, 51 there are available in the system 52 the more fine grained the content can be semantically segmented over multiple storage bubbles, the easier it gets to physically retrieve specific content by selecting a specific bubble, the bigger the total storage capacity of the bubble network, the more content redundancy can be created, the easier it is for users to consume the same content at possibly multiple locations that are not connected through a communication network.

Further the system 52 is arranged to search for data stored on the storage devices 1, 8, 50, 51 that match with storage profiles of the storage bubbles 1, 8, 50, 51 and to store data matching with the storage profile of a storage bubble 1, 8, 50, 51 in this bubble.

For instance, referring again to FIG. 5, one storage bubble 1 has the profile to collect songs of a certain kind for a low bandwidth environment, for example, environments where only communication via Bluetooth is available. It will communicate with other storage bubbles 8, 50, 51 of the same or other type and ask for popular songs in a low bit rate format. A storage bubble 51 that has some popular songs could for instance, indicate that the popular songs can be moved, using a content move action 54, to the storage bubble 1 instead of copied because the popular songs do not really fit in its own profile, and better fit with the other storage bubble's profile. Another, storage bubble 8, could decide in fact to copy content to the storage bubble 1 using a content copy action 55.

The self-organization of the storage system 52 results in a physical separation of content on the different storage bubbles 1, 8, 50, 51. A user can physically grab the content he or she is interested in because of the storage bubble's means of showing what content is stored on a storage bubble 1, 8, 50, 51. In this way the storage bubbles 1, 8, 50, 51 organize the available content such that the content stored on each storage bubble 1, 8, 50, 51 complies with its storage profile as good as possible. This mechanism enables users to physically get content they are interested in by selecting a storage bubble. Thus the system 52 comprising storage bubbles 1, 8, 50, 51 represents a distributed storage home network.

By physically organizing content in the portable storage bubbles 1, 8, 50, 51 according to the invention it is not hard to envision a consumer's home filled with storage bubbles 1, 8, 50, 51 of this kind in drawers, under the bed, close to some rendering devices etc. If, for instance, a user likes to watch action movies he/she could look in the drawer for a green lit storage bubble, when green corresponds to the genre "action movies". When the user found such a bubble he/she could, for instance, put it close to a TV equipped with means for communicating with the storage bubble, e.g. Bluetooth, and play one of the action movies stored on the bubble. Alternatively, for example, the user could instruct the storage bubble to stream the content to the TV of choice.

In general there are three sources of content for a storage bubble 1, 8, 50, 51: other storage bubbles 1, 8, 50, 51, stationary storage devices or an external network such as the Internet. For all content stored on storage bubbles 1, 8, 50, 51 metadata will be available that is needed by another storage bubble 1, 8, 50, 51 to decide whether the content is of interest. On the other hand, for stationary storage devices and other common storage devices the availability of the metadata of interest or even any metadata cannot be assumed.

Assuming that a stationary or other storage device provides UPnP like services, such as providing lists of available content and of what type the content is, for example, pictures, audio, video or any other type of data, a storage bubble 1, 8, 50, 51 can download and analyze the content stored on these devices. Based on this analysis a storage bubble 1, 8, 50, 51 can decide by comparing the analyzed content with its storage profile what content to copy to its own storage space. Content analysis of content from a stationary or other storage device has to be performed only if no other storage bubble 1, 8, 50, 51 has analyzed that content before to obtain the same metadata. To ascertain whether a content in question is already analyzed a storage bubble 1, 8, 50, 51 can send a request to the other storage bubbles 1, 8, 50, 51 in the network 17.

A storage bubble 1, 8, 50, 51 will start analyzing external content only if the request to other storage bubbles 1, 8, 50, 51 for metadata did not succeed. A storage bubble 1, 8, 50, 51 can store metadata of any content analyzed by that storage bubble, even if the content was not copied to the storage bubble, because it did not fit the profile of the device.

Because the amount of content to be analyzed can be large a storage bubble 1, 8, 50, 51 can request other storage bubbles to help to search for content that fits the profile of the storage bubble 1, 8, 50, 51 requesting the help. Storage bubbles 1, 8, 50, 51 that honor that request for help get assigned a part of the content list to analyze. The helping storage bubbles 1, 8, 50, 51 send the content analysis results back to the requesting storage bubbles 1, 8, 50, 51.

According to an embodiment of the invention the storage bubbles 1, 8, 50, 51 can decide to honor a content analysis help request if they have fulfilled their own profile goal. That is when all content available from any storage device, including other storage bubbles 1, 8, 50, 51, has been analyzed and no new content was found that matches the assigned storage profile. Using a standard like UPnP, a storage bubble 1, 8, 50, 51 can subscribe to a storage device to get a signal when new content is available on that storage device. When it is signaled, the respective storage bubble 1, 8, 50, 51 could analyze the content and decide if the content is of interest based on the assigned storage profile.

In principle it is also possible that a storage bubble 1, 8, 50, 51 misses some of content analysis capabilities that are required to fulfill its profile. In that case a storage bubble 1, 8, 50, 51 can according to an embodiment of the invention negotiate with another storage bubble 1, 8, 50, 51 with the right capabilities to do the content analysis.

The generated metadata of any content that is analyzed is kept on the storage bubble 1, 8, 50, 51 that has analyzed the content. If the content analysis was done upon request of another storage bubble 1, 8, 50, 51 the metadata can also be copied to the requesting storage bubble. The metadata is associated with content through identifying information about the content, such as file name and creation date or a previously assigned unique ID number.

By keeping the metadata of any content analyzed on the storage bubbles 1, 8, 50, 51 that analyzed the content or has requested analysis a partially redundant distributed meta data database builds up in the network of storage bubbles. Thus by means of the storage system according to the invention a distributed metadata database can be achieved.

It must be noted that the content analysis could be replaced by human annotation of the content using a user interface. This is only feasible if the metadata of interest is restricted to rudimentary information such as genre. Semi-automatic annotation techniques can result in more detailed annotations, for example, the user can indicate in one image who is the grandmother, the storage bubble can use this information to find and annotate the presence of the grandmother in other images.

According to an embodiment of the invention a user is able to control which of the storage bubbles 1, 8, 50, 51 or other devices have access control to the content stored on the storage bubbles 1, 8, 50, 51. For instance, using UPnP, a storage bubble 1, 8, 50, 51 can discover other devices in the network. For each device the user can specify what access rights it has. Also access rules with which a user can provide general security rules, for example, "all devices can access all music on this bubble", can be defined in the profiles of the storage bubbles 1, 8, 50, 51.

Since all storage bubbles 1, 8, 50, 51 can communicate and exchange data with one another all of the storage bubbles 1, 8, 50, 51 of the network 17 can be virtually represented by any device able to communicate with the storage bubbles 1, 8, 50, 51.

A device can represent a remote storage bubble, indicated with 1, 8, 50, 51, and can browse all content stored on this storage bubble 1, 8, 50, 51.

Also for playback of streams or viewing files the stream or file of a remote storage bubble 1, 8, 50, 51 can be routed to the representing device. This device can be used as a storage device manager. This "manager" device can, for instance, temporarily act as a master in the network 17 of storage bubbles. This master collects information from the other storage bubbles 1, 8, 50, 51 in the network 17.

From the perspective of the manager device representing any storage bubble 1, 8, 50, 51 in the network 17, all of the content in the storage network 17 seems to be hierarchically clustered in an intelligent way. This is because the content is intelligently clustered over multiple levels of information detail, for example, on the highest level only a color indicator is used on a lower level icons are used, etc. Especially when users have many storage bubbles 1, 8, 50, 51 it is of interest to have an overview of all storage bubbles 1, 8, 50, 51 in the network 17. In general, from the perspective of the manager device, the user can transparently browse the combined storage space created by all storage bubbles 1, 8, 50, 51; thus the user does not have to know on which storage bubble 1, 8, 50, 51 content of interest is stored.

Retrieval of desired content using the master device providing an overview of all the storage bubbles 1, 8, 50, 51 in the storage system 52, can be performed by giving rudimentary visual information about what is stored on the storage bubbles 1, 8, 50, 51. By selecting an icon representing a storage bubble 1, 8, 50, 51, for example, via point and click or by touch, more information about the content stored on the selected storage bubble can be presented.

The user interface of the selected storage bubble can be routed to and shown on the manager device. In this way using a storage bubble as a storage bubble manager a user can perform search actions remotely. Even more the device manager can route audio and video streamed from the remote storage bubble to a rendering device.

Thus the manager device can act as a virtual representation of a remote storage bubble 1, 8, 50, 51. If a user does not want to physically get a certain storage bubble 1, 8, 50, 51, the user can pick up a storage bubble 1, 8, 50, 51 close to him or her and use this as a virtual representation of the selected storage bubble 1, 8, 50, 51. To provide the manager functionality described above the storage bubbles 1, 8, 50, 51 can each comprise respective software installed in their processors. In a preferred embodiment a user can choose from a menu shown on the display of the selected bubble, for example, the bubble 1, the menu point "make this bubble a bubble manager". After activating this menu point the storage bubble 1 can send via its communication means, indicated with 3 in FIG. 1, requests to the other bubbles 8, 50, 51 to transmit information about the contents stored in them. Metadata about content on storage bubbles that do not react could be replaced by information that is available in the local metadata database of the storage bubble acting as manager; the content of the non-responsive bubbles of course remains unreachable. The storage bubble manager could indicate this. Further, it could be possible that content of the non-responsive bubble is available on any other bubble that is reachable. When a user selects content of a storage bubble that is unreachable the manager could select a copy of the selected content on another storage bubble that is reachable.

The content stored in the storage bubble network 17, as shown in FIG. 1, can be represented in a hierarchical manner. The synergy between virtual and physical representation of storage bubbles 1, 8, 50, 51 results from the fact that the content is physically segmented on different storage bubbles 1, 8, 50, 51. The content can also be virtually segmented at multiple content representation levels, from a rudimentary way to a fine granularity representation.

All of the content available in the storage bubble network indicated with 17 in FIG. 1 can be logically clustered in an intelligent way by means of the bubble manager. The intelligent clustering of content is also performed by using the metadata provided by the storage bubbles 1, 8, 50, 51, wherein similar contents build clusters of multiple levels of granularity. So videos stored in the storage bubble network 17 can constitute a cluster. This cluster can be divided into sub-clusters such as action movies or comedies etc. These sub-clusters can be divided in further sub-clusters according to for instance actors who play in the movies etc. All these information used for clustering are available in the form of metadata.

Also the content analysis processing required for analyzing low-level features and extracting metadata in the storage system or the network of storage bubbles can be done centralized by a master device too, for example, on the storage bubble manager.

Further instead of having the bubbles just lying around, the bubbles 1, 8, 50, 51 could be inserted in collets or slots, respectively, in a kind of grid-tray connected or connectable to the storage bubble manager. In this way power can be supplied by the bubble manager to inserted bubbles and possibly also all communication between the bubbles could be handled. The storage bubbles 1, 8, 50, 51 can comprise according to this embodiment of the invention connection means corresponding with connection means of the grid tray to provide bus bar or data bus connections, for example, metal sheets. The grid tray can comprise retainers for the storage bubbles 1, 8, 50, 51 and the management device in which the bubbles 1, 8, 50, 51 and the management device can be put into. The power for the storage bubbles 1, 8, 50, 51 can be supplied by means of the grid tray itself too, for example, the grid tray can comprise a power supply. Alternatively the grid tray can be connected to the public electricity network, by means of a suitable current adapter.

In the embodiments the storage bubbles 1, 8, 50, 51 can be very simple. The simplest forms are storage bubbles 1, 8, 50, 51 only containing storage, a small display and/or other indication methods, a processor and a communicating means.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of hardware. The mere fact that certain measures are recited in mutually different dependent claims does not indicate that a combination of these measures cannot be used to advantage. The terms "data" and "content" have been used interchangeably through the text, but are to be understood as equivalents.

The invention claimed is:

1. A portable data storage device, comprising:
a memory for storing content and for storing a storage profile, wherein the storage profile provides the data storage device with information about content to gather for storage;
a profile maintenance unit for selecting an information source from which storage profile update data is retrieved for the storage profile, wherein the storage profile further provides information for organizing content available to the data storage device;
communication means for receiving the storage profile update data from the information source, the profile maintenance unit updating the storage profile in the memory based upon the storage profile update data received from the information source;
a timer for triggering (i) the communication means for receiving storage profile update data from the information source and (ii) the profile maintenance unit for updating the storage profile; and
a content self-organization unit for self-organizing content available to the data storage device within a system of portable data storage devices which the data storage device is a part of, wherein the content self-organization unit self-organizes the content available to the data storage device within the system of portable data storage devices via (i) content move actions, (ii) content copy actions, and (iii) acquisition of new content not yet present in the system, based upon use of the updated storage profile.

2. A distributed self-organizing system for storing content data, the system comprising:
at least two autonomous storage devices;
a network coupling the at least two autonomous storage devices enabling an exchange of content data with one another, wherein the system is arranged to search for content data stored on the storage devices that match a storage profile of the storage devices and to store content data matching said storage profile in the storage devices with a matching storage profile, wherein the storage profile provides the data storage devices with information about content to gather for storage, and wherein the storage profile further provides information for organizing content available to the data storage devices;
communication means for receiving storage profile update data from an information source from which storage profile update data can be retrieved;
a profile maintenance unit for updating the storage profile based upon the storage profile update data received from the information source; and
a timer for triggering (i) the communication means to receive storage profile update data from the information source and (ii) the profile maintenance unit to update the storage profile, wherein each of the at least two autonomous storage devices comprise a content self-organization unit for self-organizing content available to the respective data storage device within the distributed self-organizing system which the at least two autonomous data storage devices are a part of, wherein the content self-organization unit self-organizes the content available to the respective data storage device within the distributed self-organizing system via (i) content move actions, (ii) content copy actions, and (iii) acquisition of new content not yet present in the system, based upon use of the updated storage profile.

3. A method of self-organizing content data, the method comprising:
selecting an information source from which storage profile update data can be retrieved for a storage profile to be used for organizing content available to a portable data storage device, wherein the storage profile provides the data storage device with information about content to gather for storage, and wherein the storage profile further provides information for organizing content available to the data storage device;
retrieving storage profile update data from the information source;
updating the storage profile based upon the storage profile update data received from the information source;
triggering (i) the receiving of storage profile update data from the information source and (ii) the updating of the storage profile; and
organizing content via self-organizing content available to the data storage device within a system of portable data storage devices which the data storage device is a part of, wherein self-organizing the content available to the data storage device within the system includes self-organizing via (i) content move actions, (ii) content copy actions, and (iii) acquisition of new content not yet present in the system, based upon use of the updated storage profile.

4. A method of organizing content in a distributed self-organizing system of data storage devices, wherein each of the data storage devices comprises a storage profile and an information source, wherein the storage profile provides the respective data storage device with information about content to gather for storage, and wherein the storage profile further provides information for organizing content available to the data storage devices, the method comprising the steps of:
transmitting a request for storage profile update data to the information source;
receiving the storage profile update data from the information source;
updating each storage profile based upon the storage profile update data received from the information source;
organizing content via self-organizing content available to the data storage device within the distributed self-organizing system of data storage devices which each data storage device is a part of, wherein self-organizing the content available to the data storage device within the distributed self-organizing system includes self-organizing via (i) content move actions, (ii) content copy actions, and (iii) acquisition of new content not yet present in the system, based upon use of each updated storage profile; and triggering (i) the transmission of a request for storage profile update data to the information source and (ii) the updating of the storage profile.

5. The portable data storage device as claimed in claim 1, wherein the content self-organization unit controls:
the profile maintenance unit to search for content data stored on a second data storage device that match the storage profile of the data storage device;
the communication means to receive content data from the second data storage device; and
the memory to store the received content data in the memory if the received content data matches the storage profile.

6. The portable data storage device as claimed in claim 1, wherein the profile maintenance unit creates a second storage profile based upon the storage profile update data received from the information source, wherein the second storage profile is arranged to replace the storage profile.

7. The portable data storage device as claimed in claim 1, wherein the storage profile update data received from the information source is in an equivalent format to that of the storage profile.

8. The portable data storage device as claimed in claim 1, wherein the profile maintenance unit analyzes, using an analysis method, the storage profile update data received from the information source.

9. The portable data storage device as claimed in claim 1, wherein said portable data storage device further comprises:
means for analyzing the content to extract features of the content or corresponding metadata.

10. The portable data storage device as claimed in claim 1, wherein the means for receiving is arranged for wireless communication and data exchange.

11. The method as claimed in claim 3, wherein the step of organizing content based upon the storage profile, further comprises the steps of:
synchronizing metadata with a second data storage device;
determining content data to be requested from the second data storage device;
requesting the content data from the second data storage device;
receiving the content data from the second data storage device.

12. The method as claimed in claim 3, wherein the step of organizing content based upon the storage profile, further comprises the steps of:
receiving content data requests from the second data storage device;
evaluating the content data requests from the second data storage device;
deciding which received content data requests will become granted content data requests;
transmitting, for each granted content data request, content data referred to in the granted content data request to the second data storage device.

13. The method as claimed in claim 3, wherein the step of organizing content based upon the storage profile, further comprises the steps of:
synchronizing storage profiles with a second data storage device;
determining content data to be offered to the second data storage device;
transmitting content data offers to the second data storage device;
receiving responses to the content data offers from the second data storage device;
transmitting content data to the second data storage device corresponding to accepted content data offers from the second data storage device.

14. The method of claim 3, wherein the step of organizing content based upon the storage profile, further comprises the steps of:
receiving content data offers from the second data storage device;
evaluating the received content data offers from the second data storage device;
deciding which received content data offers will become accepted content data offers;
transmitting an acknowledgement for each accepted content data offer;
receiving, for each accepted content data offer, content data referred to in the accepted content data offer from the second data storage device.

15. The method as claimed in claim 3, wherein the step of updating the storage profile based upon the storage profile update data received from the information source, further comprises the step of:
analyzing the storage profile update data received from the information source.

16. The method as claimed in claim 3, wherein the step of organizing content based upon the storage profile, further comprises the step of:
analyzing the content using content analysis to extract information contained intrinsically within the content.

17. A computer program product loadable into a memory of a programmable device, comprising software code portions for performing the steps of a method according to claim 3 when said product is run on the device.

18. The portable data storage device as claimed in claim 5, wherein the storage profile update data received from the information source comprises metadata describing content stored in one of a permanent memory, the second data storage device, and an external content source.

19. The portable data storage device as claimed in claim 5, wherein said portable data storage device further comprises:
means for performing, on reception of a search request from the second data storage device, a transmittal of found content data to the second data storage device matching with a third storage profile of the second data storage device.

20. The portable data storage device as claimed in claim 8, wherein the analysis method is stored within a permanent memory.

21. The portable data storage device as claimed in claim 8, wherein the analysis method is stored within the storage profile.

22. The portable data storage device as claimed in claim 8, wherein the analysis method is received from the information source.

23. The portable data storage device as claimed in claim 19, wherein said portable data storage device further comprises:
means for deciding, using the storage profile and the third storage profile of the second data storage device, whether to transmit a copy of requested content data to the second data storage device onto move the requested content data to the second data storage device.

* * * * *